US011128832B1

United States Patent
Klein

(10) Patent No.: US 11,128,832 B1
(45) Date of Patent: Sep. 21, 2021

(54) RULE-BASED SURVEILLANCE VIDEO RETENTION SYSTEM

(71) Applicant: Shmelka Klein, Brooklyn, NY (US)

(72) Inventor: Shmelka Klein, Brooklyn, NY (US)

( * ) Notice: Subject to any disclaimer, the term of this patent is extended or adjusted under 35 U.S.C. 154(b) by 0 days.

(21) Appl. No.: 17/142,545

(22) Filed: Jan. 6, 2021

Related U.S. Application Data

(60) Provisional application No. 63/060,273, filed on Aug. 3, 2020.

(51) Int. Cl.
| | |
|---|---|
| *H04N 5/765* | (2006.01) |
| *H04N 5/91* | (2006.01) |
| *H04N 7/01* | (2006.01) |
| *G06K 9/00* | (2006.01) |
| *H04N 7/18* | (2006.01) |

(52) U.S. Cl.
CPC ......... *H04N 5/765* (2013.01); *G06K 9/00335* (2013.01); *G06K 9/00362* (2013.01); *G06K 9/00744* (2013.01); *G06K 9/00765* (2013.01); *G06K 9/00771* (2013.01); *H04N 5/91* (2013.01); *H04N 7/0117* (2013.01); *H04N 7/0127* (2013.01); *H04N 7/181* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 7,289,723 B2 | 10/2007 | Kikuchi et al. | |
| 7,760,230 B2 | 7/2010 | Russell et al. | |
| 8,797,404 B2 | 8/2014 | Joseph et al. | |
| 10,185,628 B1* | 1/2019 | Snyder | G06F 11/1451 |
| 10,412,420 B2 | 9/2019 | Drako et al. | |
| 2010/0007731 A1* | 1/2010 | Joseph | G08B 13/19667 348/143 |
| 2010/0208064 A1 | 8/2010 | Liu et al. | |
| 2013/0080411 A1* | 3/2013 | Rolia | G06F 16/00 707/694 |
| 2014/0219628 A1* | 8/2014 | Miner | H04N 5/91 386/227 |
| 2014/0232863 A1* | 8/2014 | Paliga | H04N 21/278 348/143 |
| 2016/0309121 A1 | 10/2016 | Chan et al. | |
| 2017/0110151 A1* | 4/2017 | Matias | G06K 9/00758 |
| 2020/0410540 A1* | 12/2020 | Williams | H04W 4/23 |
| 2021/0090183 A1* | 3/2021 | Kerr | H04L 9/3226 |

* cited by examiner

*Primary Examiner* — Eileen M Adams
(74) *Attorney, Agent, or Firm* — Goldstein Law Offices, P.C.

(57) ABSTRACT

A video retention system comprising a camera operated by a recording entity, and a video retention server adapted to receive, analyze, and manage video captured by the camera. The video retention server generates a one or more rules using a plurality of user-specified retention parameters which describe the recording entity and a desired retention objective. The rules embody video retention requirements applicable to the recording entity under applicable laws, regulations, and industry standards, and the video retention server executes the rules to delete unnecessary video files while retaining the video files which are necessary to comply with the video retention requirements associated with the specified retention objectives.

18 Claims, 14 Drawing Sheets

| Rule ATM 1 | —29A1 |
| --- | --- |
| Zone: Outdoor ATM (ATM1) | —74A |
| Trigger: Person Detection or Motion Activity | —59 |
| Duration: 45 Days | —60 |
| Objective: Legal Compliance | —54R |
| Video Resolution: 1280x720 | —62R |
| Video Framerate: 15 frames per second | —62F |

58 points to the rule block; 62 points to the video settings.

| Rule ATM 2 | —29A2 |
| --- | --- |
| Zone: Entrance | —72E |
| Trigger: Person Detection | —59 |
| Duration: 45 Days | —60 |
| Objective: Regulatory Compliance | —54R |
| Video Resolution: 1280x720 | —62R |
| Video Framerate: 15 frames per second | —62F |

*FIG. 4B*

Rule: Handling —29H
Zone: Holding Area, Stunning Area, or Slaughter Area —58
Trigger: Person Detection —59
Duration: 6 Months —60
Objective: Industry Standards —54P Rule: Security —29P
Zone: Exterior Zones, Door Zone, Packing Area —58
Trigger: Person Detection —59
Duration: 2 Years —60
Objective: Legal Compliance —54R Rule: General Safety —29S
Zone: ALL —58
Trigger: Continuous —59
Duration: 1 Week —60
Objective: Safety —54S

*FIG. 5B*

| | |
|---|---|
| Rule: Theft | —29T |
| Zone: Aisle Zones | —58 |
| Trigger: Person Detection | —59 |
| Duration: 6 Months | —60 |
| Objective: Industry Standards | —54P |

| | |
|---|---|
| Rule: Accidents | —29L |
| Zone: ALL | —58 |
| Trigger: Person Detection and Fall Detection | —59 |
| Duration: 3 Years | —60 |
| Objective: Litigation Defense | —54L |

*FIG. 6B*

RULE-BASED SURVEILLANCE VIDEO RETENTION SYSTEM

CROSS-REFERENCE TO RELATED APPLICATIONS

This application is a nonprovisional utility application of provisional patent application, Ser. No. 63/060,273 filed in the United States Patent Office on Aug. 3, 2020, claims priority therefrom, and is expressly incorporated herein by reference in its entirety.

TECHNICAL FIELD

The present disclosure relates generally to a video surveillance system. More particularly, the present disclosure relates to a video surveillance system for generating and executing rules to facilitate automated compliance with video retention requirements.

BACKGROUND

Video surveillance is a vital tool for many businesses and establishments. For example, retail stores employ video surveillance to deter theft and document accidents or other incidents which may be the cause of potential lawsuits. Certain businesses, such as banks, are required by law to record and retain video showing activities which occur on site. Although it is desirable to retain as much recorded video as possible to retain key footage, all video surveillance systems are limited by storage capacity, and deletion of old footage becomes necessary once the accumulated video exceeds the available storage.

The prior art contains many examples of video surveillance systems which use automated processes to identify events or other significant content which may be present within recorded footage, so that redundant or unnecessary footage may be deleted to conserve storage resources. However, such systems are not capable of automatically determining which portions of the retained footage must be retained under applicable requirements, and which portions may be safely deleted. For example, footage that records an accident and resulting injury may be deleted once the statute of limitations for personal injury actions has expired in the jurisdiction in which the accident was recorded. However, manual review and deletion of redundant footage is impractical. The application of blanket retention rules, such as the deletion of all video footage after a set time period, allows redundant video to persist until deletion, resulting in the inefficient use of storage resources.

Therefore, a need exists for a video retention system which is capable of automatically identifying video retention requirements under local laws and practices which apply to a recording entity such as a business or organization, generating customized rules which embody the identified video retention requirements, and executing the rules to identify and retain video footage to comply with the requirements, and delete any unnecessary video footage to conserve storage resources.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system which allows a recording entity, such as a business, organization, individual, or other entity, to record and retain surveillance video while remaining in compliance with applicable laws, regulations, and best practices. Accordingly, the present disclosure provides a video retention system comprising a camera for capturing video, and a video retention server which receives, analyzes, and manages the video as a plurality of video files according to pre-generated rules. The video retention system allows a user to select or define a plurality of retention parameters such as an industry classification, a location, and a retention objective such as legal compliance with local statutory and regulatory requirements, industry standards and best practices, and other objectives. The video retention system generates a retention rules profile embodying video retention requirements which are applicable to the recording entity based on the retention parameters. The video retention server further manages the video files by deleting unnecessary video while retaining the video files needed to facilitate compliance with the selected retention objectives.

It is another aspect of an example embodiment in the present disclosure to provide a system with the flexibility to meet a variety of different video retention requirements. Accordingly, the video retention server is adapted to analyze the content of the recorded video files to detect surveillance related content such as the presence of persons, motion activity, or events which are relevant to the video retention requirements. The video retention is further adapted to generate rules which have triggers corresponding to specific combinations of surveillance related content. The rules are executed by the video retention server, causing video files containing the relevant surveillance related content to be retained.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 4B is a block diagram showing example rules which control retention of video files recorded at the banking facility, in accordance with an embodiment in the present disclosure.

FIG. 5B is a block diagram showing example rules controlling retention of videos recorded at the meat packing facility, in accordance with an embodiment in the present disclosure.

FIG. 6B is a diagrammatical plan view showing example rules controlling retention of videos recorded at the retail store, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
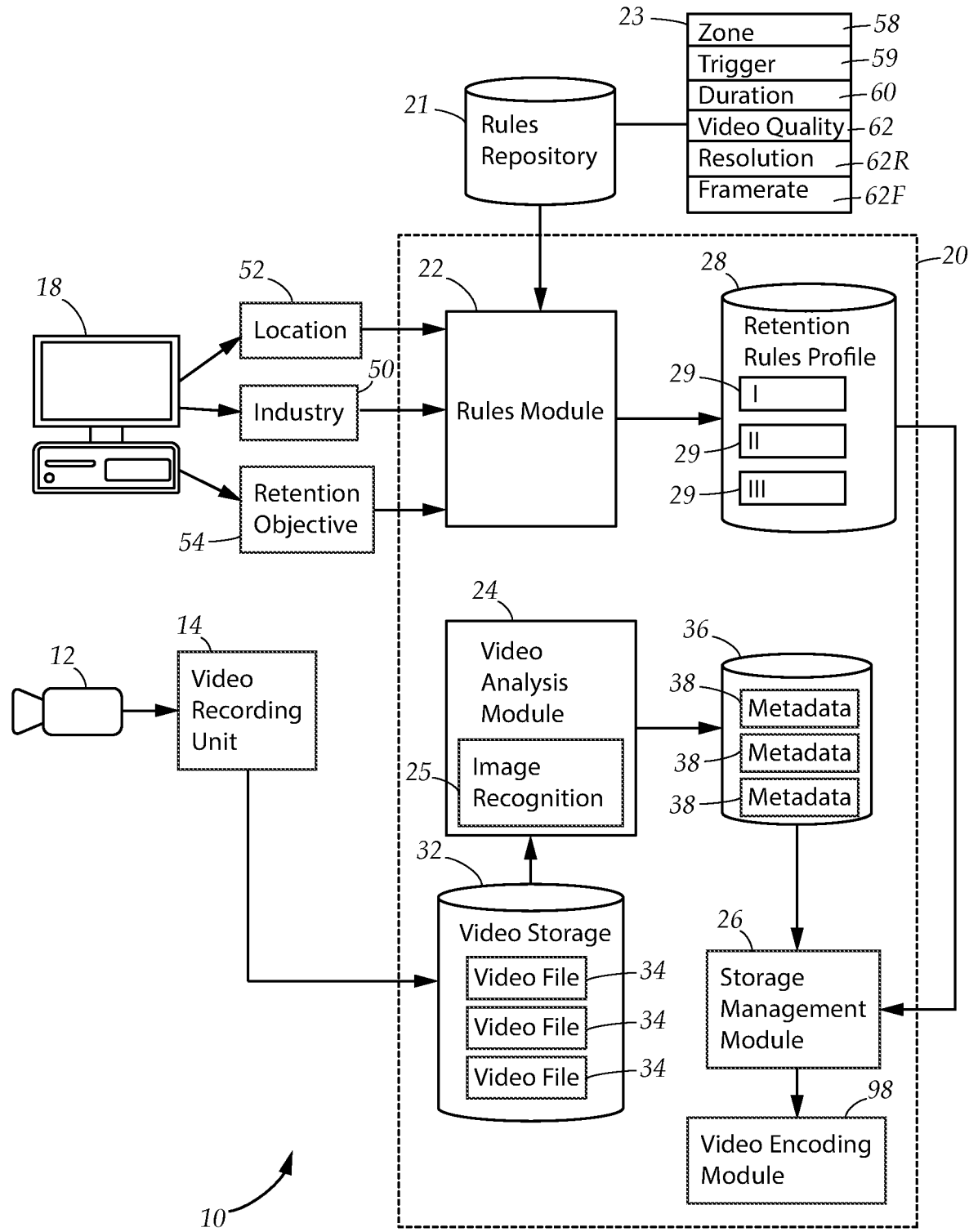
FIG. 1A is a block diagram depicting a video retention system, in accordance with an embodiment in the present disclosure.
Figure 1B:
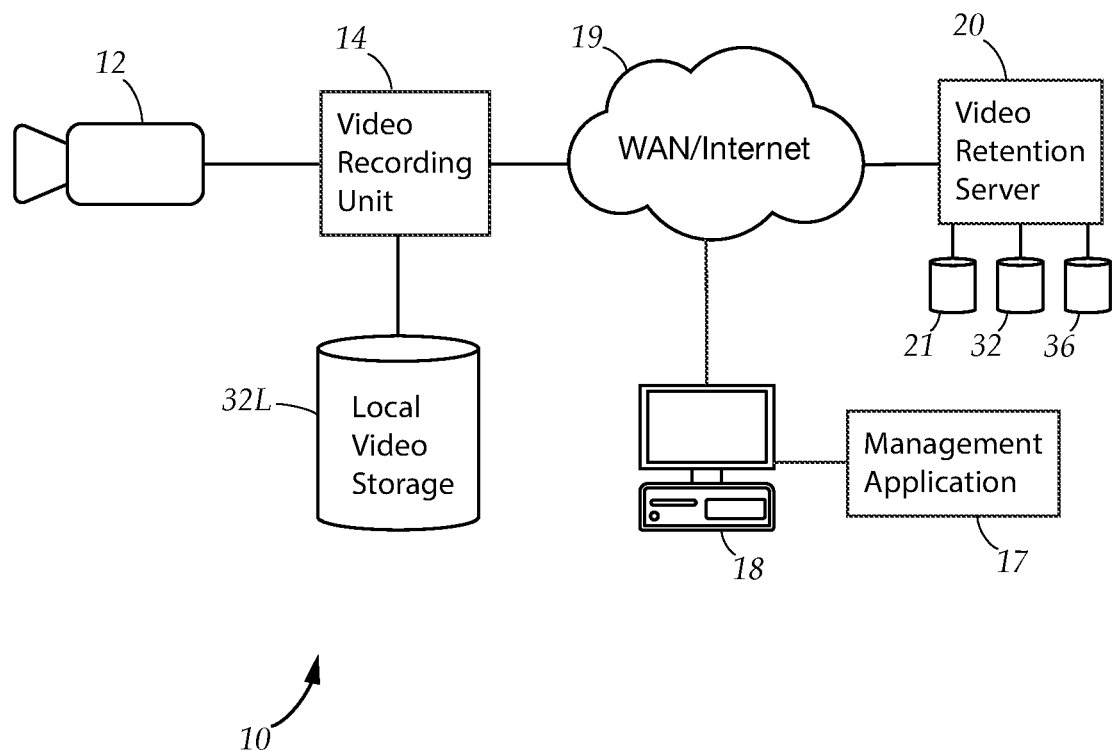
FIG. 1B is a block diagram depicting a video retention system adapted to receive and remotely retain video which is transmitted by the camera over a data communication network, in accordance with an embodiment in the present disclosure.

FIGS. 1A-B illustrate a video retention system 10 comprising at least one camera 12 operated by a recording entity for capturing images as image content and producing output video, and a video retention server 20 adapted to manage and retain the output video as a plurality of video files 34 in accordance to pre-defined rules 29 and retention objectives 54. The recording entity represents a business, organization, person, or establishment with a need to record and retain video in accordance with video retention requirements 23. In one embodiment, the video retention server 20 has a video storage 32 for storing the video files 34, a rules module 22 for generating a retention rules profile 28, a video analysis module 24 for analyzing the contents of video files 34, and a storage management module 26 for performing a video management function in accordance with the retention rules profile 28, such as retaining, segmenting, editing, or deleting the video files 34. This allows the video retention system 10 to more efficiently utilize computing resources by using a rules-based analysis to delete unnecessary video files 34 while retaining video files 34 which are required to comply with the retention objectives 54. The video retention system 10 further comprises a user device 18, such as a personal computer, smartphone, tablet, or other portable computing device, which is adapted to execute a management application 17 which allows a user to configure the video retention system 10 and select the retention objectives 54. The user device 18 is adapted to receive user inputs, such as via a touchscreen, keyboard, mouse, or other input device.

Figure 2:
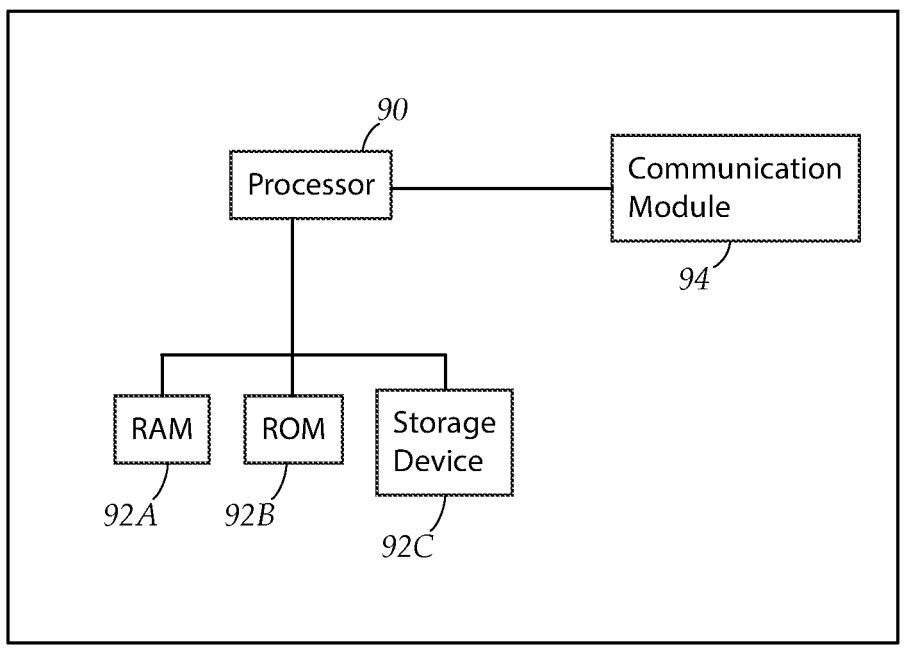
FIG. 2 is a block diagram depicting an example architecture of the video retention server, in accordance with an embodiment in the present disclosure.

Referring to FIG. 2 alongside FIGS. 1A-B, the video retention server 20 may be any computing device capable of performing server operations and executing the functions of the video retention system 10. The video retention server has a processor 90, a RAM 92A, a ROM 92B, a computer storage device 92C, and a communication module 94 which allows the video retention server 20 to transmit and receive data via a communication network 19 such as the internet. The rules module 22, the video analysis module 24, and the storage management module 26 may be implemented as units of software or computer hardware which are configured to perform functions as described herein. In certain embodiments, the video analysis module 24 or storage management module 26 may be implemented using external computing devices which communicate with and are controlled by the video retention server 20, to allow the necessary functions to be performed.

Referring to FIGS. 1A and 1B, output video captured by the camera 12 may be transmitted to a video recording unit 14, such as a surveillance video recording device, a computing device, or other suitable device. The video retention server 20 and the video recording unit 14 are operably connected via the data communication network 19. The video files 34 may be stored locally using a local video storage 32L operably connected to the video recording unit 14, and may also be transmitted to the video retention server 20 to be stored using the video storage 32. In other embodiments, the camera 12 may be an IP camera which is adapted to transmit video directly to the video retention server 20 via the data communication network to be stored via the video storage 32. In certain embodiments, the video files 34 are first stored temporarily on either the video storage 32 or local video storage 32L, subject to subsequent analysis and retention or deletion by the video retention server 20 in accordance with the retention rules profile 28. In other embodiments, the video captured by the camera 12 may be transmitted to the video retention server 20 for real-time analysis, resulting in the video being retained or discarded in accordance with the rules retention profile 28.

In some embodiments, the cameras 12 may be analog video cameras which output video in an analog format. The analog video produced by such cameras may be digitally converted to produce video files 34, prior to being transferred to the video retention server 20 for analysis. It will be apparent to a person of ordinary skill in the art that analog video may be converted into digital video files using a variety of means, such as through the use of analog to IP converters, standalone video encoding devices, as well as video encoding software.

The video retention server 20 is adapted to analyze the video files 34 to identify surveillance related content present therein. The surveillance related content corresponds to events such as objects, persons, or other content appearing within the video files 34 which are relevant to determining the appropriate video management function which should be undertaken by the video retention system 10. Examples of event types may be a person detection indicating a person is visible within the video, detected motion and other activity, as well as other incidents relevant to retention objectives. In certain embodiments, the video analysis module 24 is adapted to detect incidents such as accidents or injuries, such as slip and fall incidents, affecting or involving the persons detected within the video files 34. The video files 34 are also associated with timing information, allowing portions of the video as well as the surveillance related content to be referenced according to time. For example, frames within the video file 34 may be timestamped by time and date. The video analysis module 24 may utilize various image recognition and video content analysis technologies, such as artificial intelligence or machine learning, as will be apparent to a person of ordinary skill in the art in the field of the invention. The image recognition and video content analysis technologies may be represented by an image recognition module 25 operating under the control of the video analysis module 24. The image recognition module 25 may be implemented using software which is executed by the video retention server 20, external third party image recognition software such as cloud-based software, as well as hardware devices capable of performing the required functions. The person of ordinary skill in the art will also appreciate that various surveillance video systems and examples of image analysis software in general use are capable of detecting the attributes, events, triggers, and other combinations thereof which are described in the present disclosure. In certain embodiments, the camera 12 may be equipped with integrated image recognition capabilities, and may perform some of the functions of the image recognition module 25 by detecting event occurrences in real-time.

In one embodiment, the video analysis module 24 creates video metadata sets 38 which are associated with the video files 34 and which describe the surveillance related content detected therein. In certain embodiments, the video analysis module 24 may also have facial recognition capabilities and be further adapted to determine demographic information from any persons shown within the video files, such as age category, gender, or other personal attributes. In one embodiment, the video analysis module 24 employs facial recognition or other image recognition software, hardware, or techniques, to determine whether each person is an adult or a child, and whether each person is male or female. The video metadata 38 may be maintained by the video retention server 20 within a video metadata storage 36, allowing the video metadata 38 to be stored separately from the video files 34.

In certain embodiments, the surveillance related content may also include interactions or situations involving multiple persons. The image recognition module 25 may be adapted to detect groups of persons appearing within the video footage, by counting persons and determining their proximity to other persons concurrently depicted. The video analysis module 24 may further combine grouping data with personal attributes. For example, one trigger condition 59 may correspond to a detection of a group comprising a child and an adult, or a group comprising a man and a woman. The imagine recognition module 25 may also be adapted to identify actions between detected persons representing physical altercations, assaults, violence, or other potentially unlawful actions. The image recognition module 25 may also be adapted to detect emotions through image analysis, such as emotions indicative of distress or anger, which may be indicative of violent or undesirable behavior between persons.

Figure 3A:
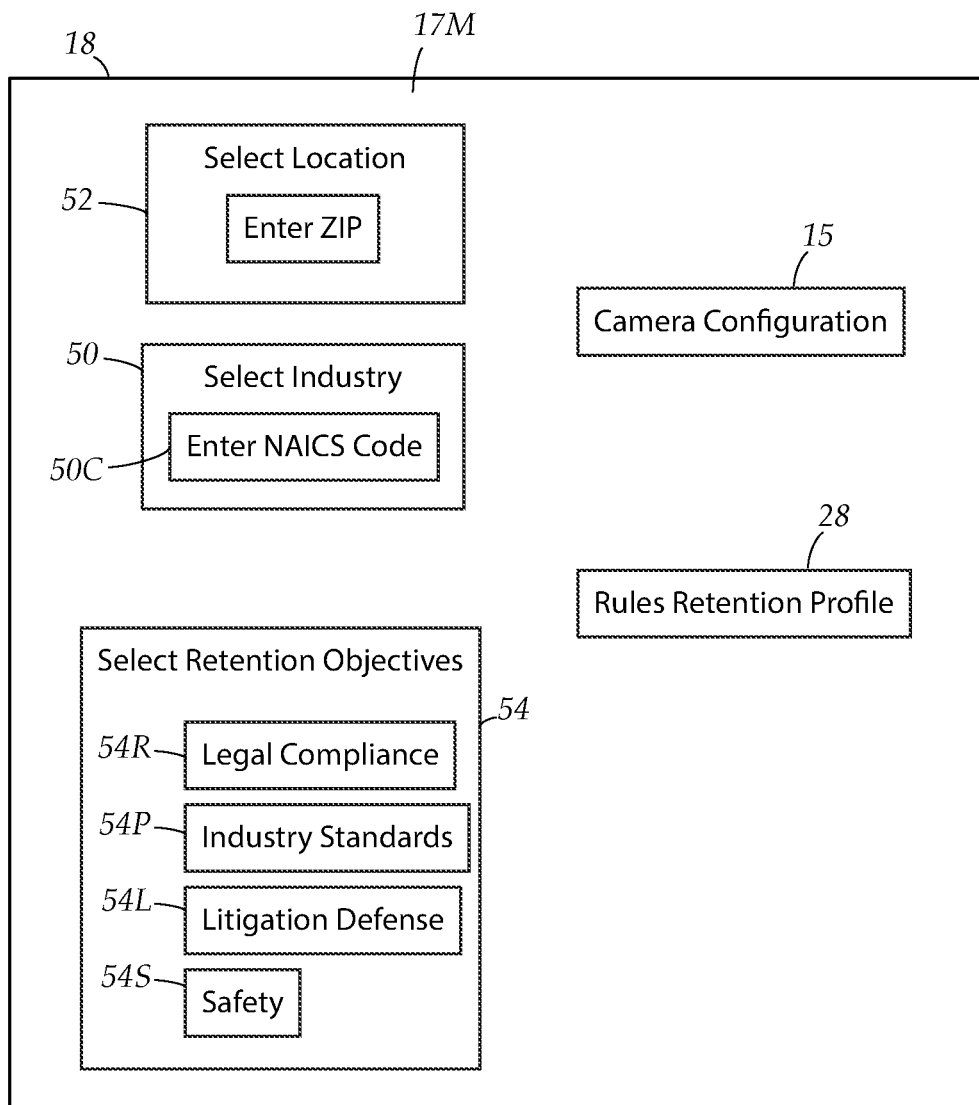
FIG. 3A is a diagrammatical front view depicting a user device screen displaying a management application and management interface, in accordance with an embodiment in the present disclosure.
Figure 4A:
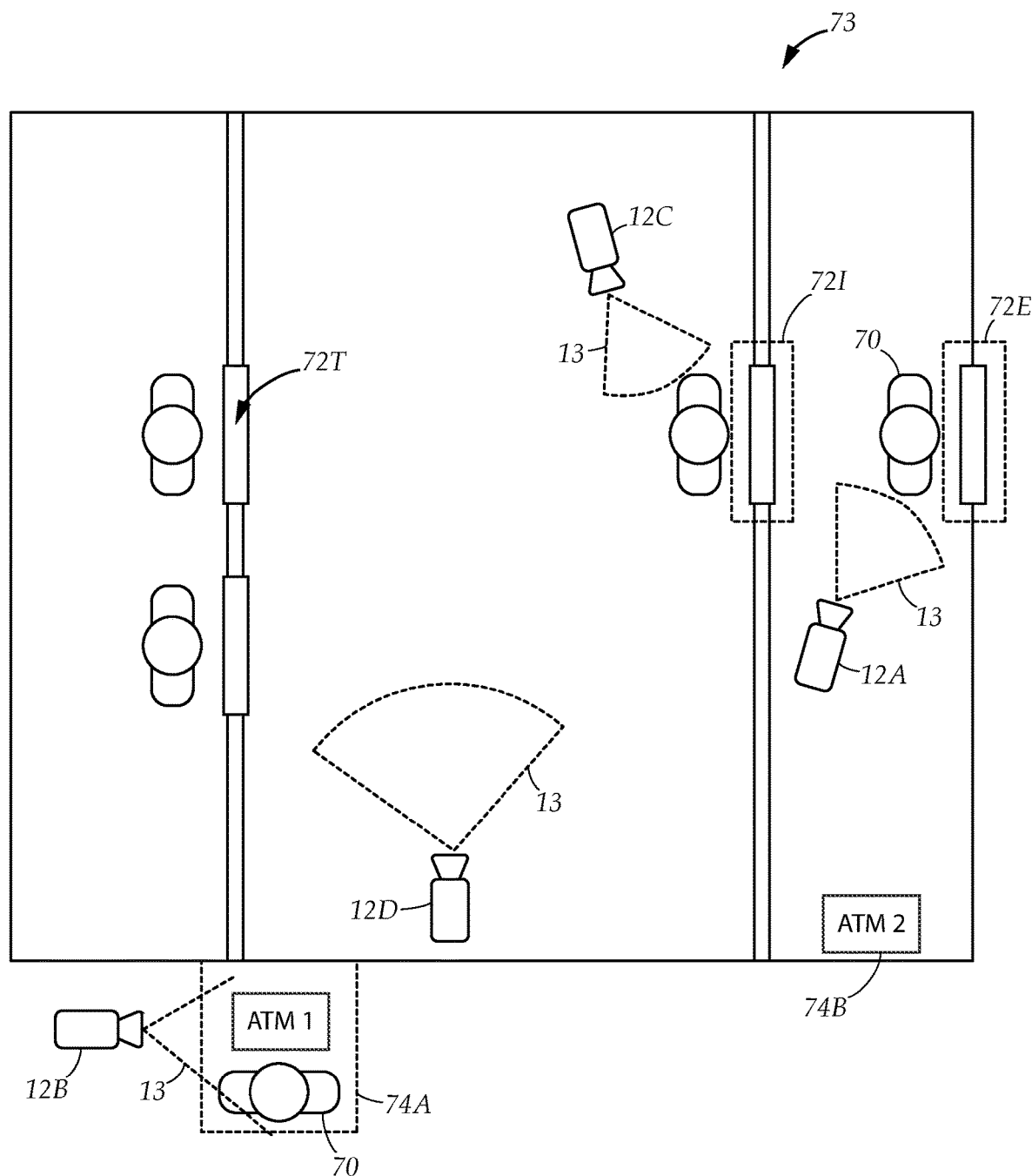
FIG. 4A is a diagrammatical plan view showing a bank facility with a plurality of zones and cameras, in accordance with an embodiment in the present disclosure.
Figure 4C:
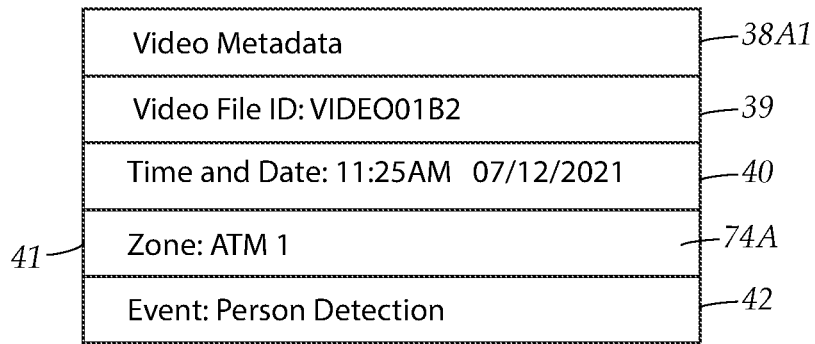
FIG. 4C is a block diagram showing example video metadata extracted from the video files recorded at the banking facility, in accordance with an embodiment in the present disclosure.
Figure 4C:
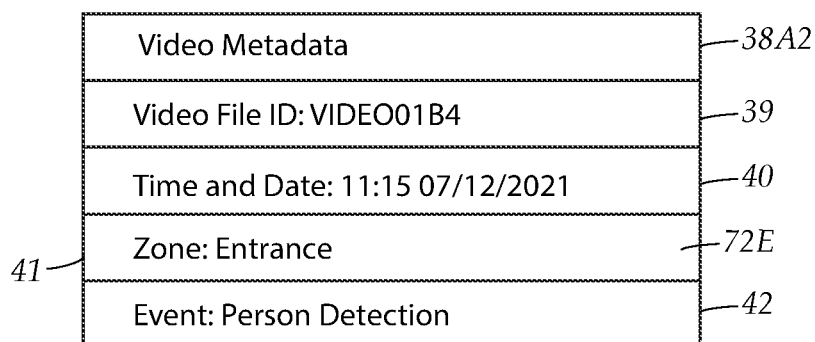
Figure 4C:
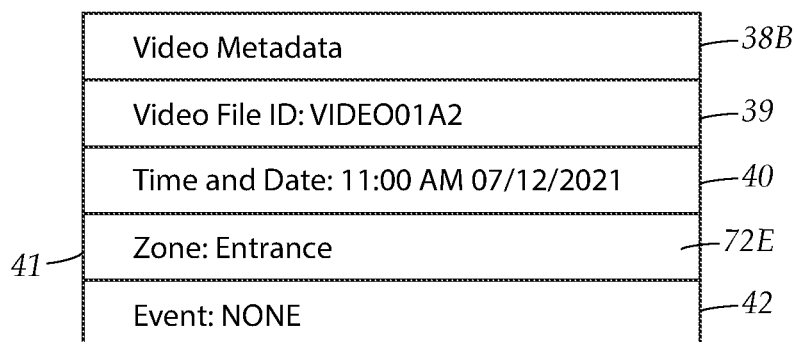

Turning to FIGS. 4A and 4C while also referring to FIG. 1A, an example video metadata set 38A1 is shown. In the present example, the video analysis module 24 analyzes a video file 34 recorded by a camera 12B observing zone "ATM1" 74A. The resulting example video metadata 38A1 contains a video identifier 39, such as a file name, which links the video metadata 38 to the video file 34 with which the video metadata is associated. The example video metadata 38A1 also describes a detection event 42, a zone identifier 41, as well as a timestamp 40 which specifies the time and date upon which the detection event 42 occurred. The zone identifier 41 describes a physical location, such as a room, a door, a space, or an object which has particular significance or relevance to the video retention requirements 23. A detection event 42 corresponds to an identification of specific objects or persons within the video by the video analysis module 24, which is then recorded in the video metadata. In the present example, the detection event 42 describes the appearance within the video file of a person 70 entering zone "ATM1" 74A, while the zone identifier 41 links the detection event 42 to a either the particular camera 12B or zone identifier 41. Returning to FIG. 3A while also referring to FIGS. 1A-B and FIG. 4A, the management application 17 may allow the user to define a camera configuration 15, which specifies the number of cameras 12 being utilized to supply video, as well as any zones which are associated with each camera 12. For example, a camera configuration 15 may include a total of four cameras 12 each associated with a different zone, including "Camera A" 12A which is positioned to capture video of an entrance 72E, "Camera B" 12B which is positioned to capture video of "ATM1" 74A, "Camera C" 12C positioned to capture video of interior doorway 72I, and "Camera D" 12D positioned to capture video of a teller area 72T.

Figure 3B:
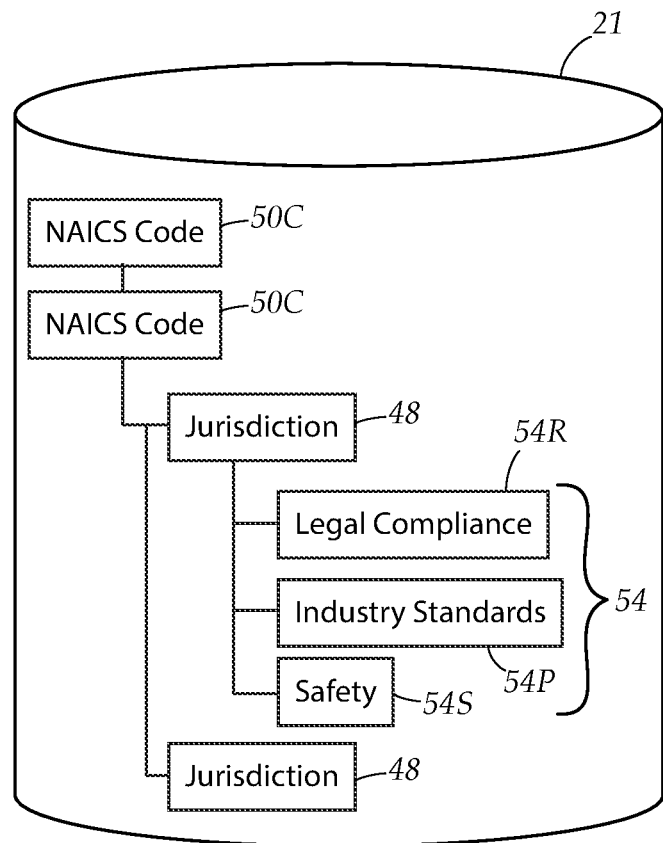
FIG. 3B is a block diagram depicting a rules repository storing video retention requirements in a hierarchical format which are referenced using a plurality of retention parameters, in accordance with an embodiment in the present disclosure.
Figure 7:
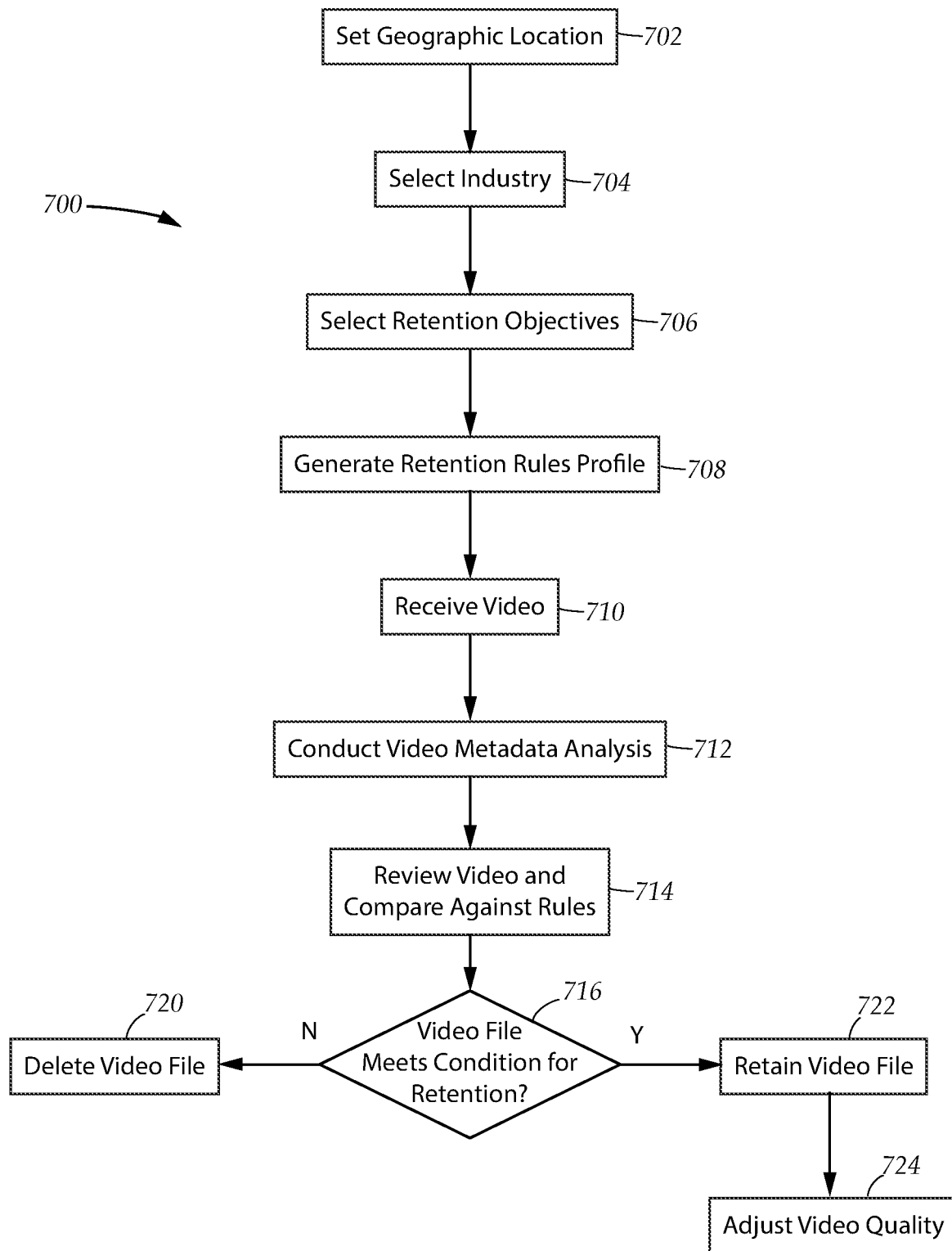
FIG. 7 is a flowchart depicting an example video retention process, in accordance with an embodiment in the present disclosure.

Turning to FIGS. 3A-B and FIG. 7 while also referring to FIGS. 1A-B, an exemplary video retention process 700 summarizes the features of the video retention system 10. The video retention server 20 analyzes the surveillance related content contained within each video file 34 to determine appropriate video management function to perform, in accordance with the retention objective 54. In a preferred embodiment, the video retention system 10 generates a retention rules profile 28 tailored to specific criteria applicable to the recording entity, using a plurality of user-defined retention parameters, comprising industry 50, geographical location 52, and at least one retention objective 54.

At steps 702, 704, and 706, a user accesses the video retention system 10 via the user device 18, and enters input which corresponds to the appropriate retention parameters embodied in the rules repository 21. In one embodiment, the management application 17 allows the user to enter the retention parameters for the recording entity using a management interface 17M displayed via the user device 18.

Alternatively, the features of the management application may be replicated using a website which is accessible via the user device 18.

The rules repository 21 stores the video retention requirements 23 in a structured manner, such as using a database, lookup table, hierarchical tree, or other suitable format for organizing data, which allows the rules module 22 to identify the video retention requirements 23 which apply to the recording entity given the set of selected retention parameters. In a preferred embodiment, the retention parameters include an industry 50 parameter, a location 52 parameter, and a retention objective 54 parameter. The industry 50 retention parameter describes the nature of the activities conducted by the recording entity, and specific video retention requirements 23 may vary significantly between different industries. For example, the video retention requirements 23 for a retail store may be very different from the video retention requirements 23 for a manufacturing facility. The industry 50 may be referenced within the rules repository 21 using names, numbers, or a combination of both. In one embodiment, each industry 50 may be referenced using a NAICS (North American Industry Classification System) code 50C, which the management application 17M may allow the user to input directly when selecting the retention parameters.

The video retention requirements 23 for each industry 50 are further dependent on the geographic location 52 in which the recording entity is located. In one embodiment, the geographic location 52 parameter of the recording entity is matched with one or more applicable jurisdictions such as countries, states or provinces, and municipalities. The retention objective 54 parameter describes a purpose for which the recording entity is recording and retaining video, and each retention objective 54 may be associated with one or more video retention requirements 23. In one embodiment, the retention objective 54 parameter may comprise legal compliance 54R with statutory and regularly requirements, industry standards 54P or voluntary best practices, litigation defense 54L, safety and security 54S, as well as other objectives.

Referring to FIG. 4A-B while also referring to FIG. 1A, FIGS. 3A-B, and FIG. 7, once the retention parameters have been entered by the user, the rules module 22 generates a retention rules profile 28 containing at least one rule 29, based on the selected retention parameters at step 708. The retention rules profile 28 is utilized by the video retention server 20 to determine the manner in which each video file 34 is retained or deleted in accordance with the retention objective 54. At step 710, the video retention server 20 receives the video recorded by the cameras 12 in the form of video files 34 or a direct video feed, and the video analysis module 24 reviews the video and generates video metadata 38 describing the surveillance related content at step 712. At step 714 the video retention server 20 analyzes the video metadata 38 associated with each video file 34 and compares it against each rule 29. At step 716, the storage management module 26 proceeds to determine the appropriate video management function, such as by determining whether each video file 34 should be retained, or deleted.

Each rule 29 is structured to allow the video retention server 10 to identify which video files must be retained, as well as the length of the retention. For example, certain video files 34 may be automatically retained for a set period of time, while other video files are only retained if they meet a certain condition. If the video file 34 does not satisfy the condition for retention under any of the rules 29, the video file 34 will be deleted at step 720. Conversely, if the video file 34 is determined to satisfy the condition for retention, then the video file 34 will be retained at step 722.

In a preferred embodiment, the rules 29 may be implemented using a series of conditional commands which are executed by the video retention server 20. In one embodiment, each rule 29 comprises a trigger 59, and a duration 60. The trigger 59 corresponds to surveillance related content within the video file 34 which causes the video retention server 20 to retain a video file 34. For example, the trigger 59 may correspond to an event trigger which is linked to an event occurrence, such as a person detection event, which is described in the video metadata 38 associated with the video file 34. The trigger 59 may also indicate a specified time interval. For example, the industry standard for a recording entity may require the retention of all video files recorded during business hours, and the trigger would therefore be met if the time at which the video file is recorded falls within the business hours of the recording entity. In one embodiment, the rules module 22 may automatically incorporate the camera configuration 15 into the generated rules 29 by linking the zone condition 58 to the appropriate zone as defined in the camera configuration 15, thus eliminating the need for the user to manually configure the rules 29.

The duration 60 specifies an amount of time for which the video file 34 must be retained in order for the recording entity to be in compliance with the retention objective 54. Video files 34 which have been retained for longer than the duration 60 of the rule 29 under which it was retained, are no longer subject to retention and may therefore be deleted. In certain embodiments, the rules conditions may further comprise a zone condition 58, which links the rule 29 to a particular zone which is required to be subjected to video surveillance. Rules 29 with zone conditions 58 will therefore apply only to video files 34 which are associated with the zone which corresponds to the zone condition 58. In certain embodiments, an event trigger may be associated with an event-related duration which supplants or overrides the duration 60 of the rule, if the event trigger is met and an event occurrence is detected. For example, the presence of persons depicted within the video file 34 may cause retention of the video file 34 for an extended period of time.

In a preferred embodiment, each video file 34 has video attributes comprising a video resolution, and a video framerate. Each rule 29 may also include one or more video quality requirements 62. In one embodiment, the video quality requirements 62 include a required resolution 62R, and required framerate 62F. The required resolution 62R determines the clarity of the captured video, and may be quantified through pixel count, while the required framerate 62F may be quantified in terms of frames per second. The video quality requirements 62 may differ depending on the selected retention parameters. For example, in one embodiment, the video quality requirements 62 are determined using a combination of location 52, industry 50, and retention objective 54. In one example, in order to meet retention requirements in accordance with the legal compliance 54R retention objective 54, the specific video quality requirements 62 correspond to minimum requirements set forth by laws and/or regulations which are applicable to the jurisdiction in which the recording entity is physically located. Furthermore, the jurisdiction may specify different video quality requirements 62 depending on the industry 50 of the recording entity. For example, an example jurisdiction may require video to be retained at a required resolution 62R of at least 1280×720 pixels per frame, with a required framerate 62F of at least fifteen frames per second. Alternatively, the specific video quality requirements 62 may be determined based on other retention objectives 54, such as industry standards 54P, litigation defense 54L, or Safety 54S. Returning to the exemplary video retention process 700, retained video files 34 may be modified at step 724 to meet the specified video quality requirements 62.

In certain embodiments, rules 29 may associate various trigger conditions 59 and/or zone conditions 58 or different video quality requirements 62. For example, a rule 29 may specify that the required resolution 62R and required framerate 62F be increased when a particular event is detected within the video content, whereas other video content which does not depict an instance of the event is retained at a lower quality.

The size of video files 34 will generally increase proportionally with video quality, and video cameras 12 are often capable of recording video which exceeds the minimum video quality requirements. Therefore, to increase efficiency and to conserve the storage capacity of the video storage 32, the video retention server 20 may ensure that retained video files 34 are stored at the video quality needed to satisfy the video quality requirements 62 as defined by the selected retention parameters. In certain embodiments, the video retention server 20 may therefore be adapted to convert the retained video files 34 to match the required resolution 62R and required frame rate 62F as specified in the video quality requirements 62. This can be achieved through the use of known video encoding/transcoding software or hardware, as will be appreciated by a person of ordinary skill in the art in the field of the invention. Such video encoding/transcoding software may be represented as a video encoding module 98, which is controlled by the video retention server 20. In certain embodiments, the video encoding module 98 may also be adapted to re-encode or compress retained video files 34 to conserve storage space within the video storage 32.

In an alternate embodiment, the cameras 12 are able to record video in various resolutions and framerates, and are thus able to directly capture and produce output video which has the video attributes to match the video quality requirements 62. In certain embodiments, the video retention server 20 is adapted to communicate directly with the cameras 12 in order to set the video attributes to match the video quality requirements 62.

Referring to FIG. 4A-C while also referring to FIG. 1A and FIG. 3A, in one example, the recording entity is a commercial banking facility 73 which operates an ATM (automatic teller machine) in the state of New York. The industry retention 50 parameter may be the NAICS code of "522110" corresponding to "Commercial Banking". The location 52 parameter may be represented by a ZIP Code, address, or a manual selection, which links the recording entity to the jurisdiction of New York. The retention objective 54 may be legal compliance 54R. After applying the parameters and consulting the rules repository 21, the rules module 22 may determine that the recording entity is subject to video retention requirements under the ATM Safety Act of New York, as well as other requirements that are not considered in this example. The ATM Safety Act dictates video surveillance security measures which banking institutions operating facilities containing automated teller machines are required to comply with. The banking institution is required to record all persons 70 entering a facility containing an ATM and record all activity within three feet of an ATM located outdoors, and the recordings are required to be maintained for at least forty-five days.

In the present example, the banking facility 73 has one ATM machine 74B located within the banking facility, and another ATM machine 74A located outside the banking facility 73. The video retention requirements 23 mandated under the ATM Safety Act may be represented using two rules 29—"Rule ATM1" 29A1 which is tailored to the requirements for outdoor ATMs, and "Rule ATM2" 29A2 which is tailored to the requirements for ATMs located within the facility. Both rules 29A1, 29A2 have the retention objective of legal compliance 54R.

Referring to FIGS. 4A-C while also referring to FIG. 1A, "Rule ATM1" 29A1 may have a zone condition 58 which specifies that the rule applies only to video files 34 associated with zone "ATM1" 74A, a trigger 59 which corresponds to a person detection or motion activity detection, and a duration 60 of forty-five days. "Rule ATM2" 29A2 may have a zone condition 58 which specifies that the rule applies only to video files 34 associated with zone "ATM2" 72E, a trigger 59 which corresponds to a person detection, and a duration 60 of forty-five days. "Rule ATM1" 29A1 will cause the video retention server 20 to retain any video files 34 which record any activity, represented by the presence of persons 70 or motion activity, which occurs near ATM1 74A, for a period 60 of forty-five days. Similarly, "Rule ATM2" 29A2 will cause the video retention server 20 to retain any video files 34 which show persons entering the facility through the entrance 72E, for a period 60 of forty-five days.

In the present example, three sets of video metadata 38 associated with three video files 34 are generated by the video analysis module 24. The first video metadata set 38A1 is associated with the zone identifier "ATM1" 74A, indicating that the associated video file 34 was recorded around the outdoor ATM 74A, and describes a detection event 42 corresponding to a person approaching the outdoor ATM 74A at 11:25 AM. The video metadata 38A1 therefore satisfies the zone condition 58 and trigger 59 of "Rule ATM1" 29A1, thus causing the video retention server 20 to retain the associated video file 34 according to the duration 60. Similarly, the second video metadata set 38A2 describes a detection event 42 corresponding to a person walking through the entrance 72E at 11:15 AM, thus satisfying the zone condition 58 and trigger 59 of "Rule ATM2" 29A2. A third video metadata set 38B describes a video file 34 which was recorded at 11:00 AM and depicts the entrance 72E. However, no detection event 42 is described by the third video metadata set 38B, which indicates that the video file 34 associated with the third video metadata set 38B fails to show any person entering the facility 73 through the entrance 72E. This video file 34 is not retained in accordance to any of the rules in the present example, and may therefore be deleted by the storage management module 26.

In certain embodiments, the trigger 59 of a rule 29 may correspond to a specified time interval. For example, the industry standard for a recording entity may require the retention of all video files recorded during business hours, and the trigger would therefore be met if the time at which the video file is recorded falls within the business hours of the recording entity.

Figure 5A:
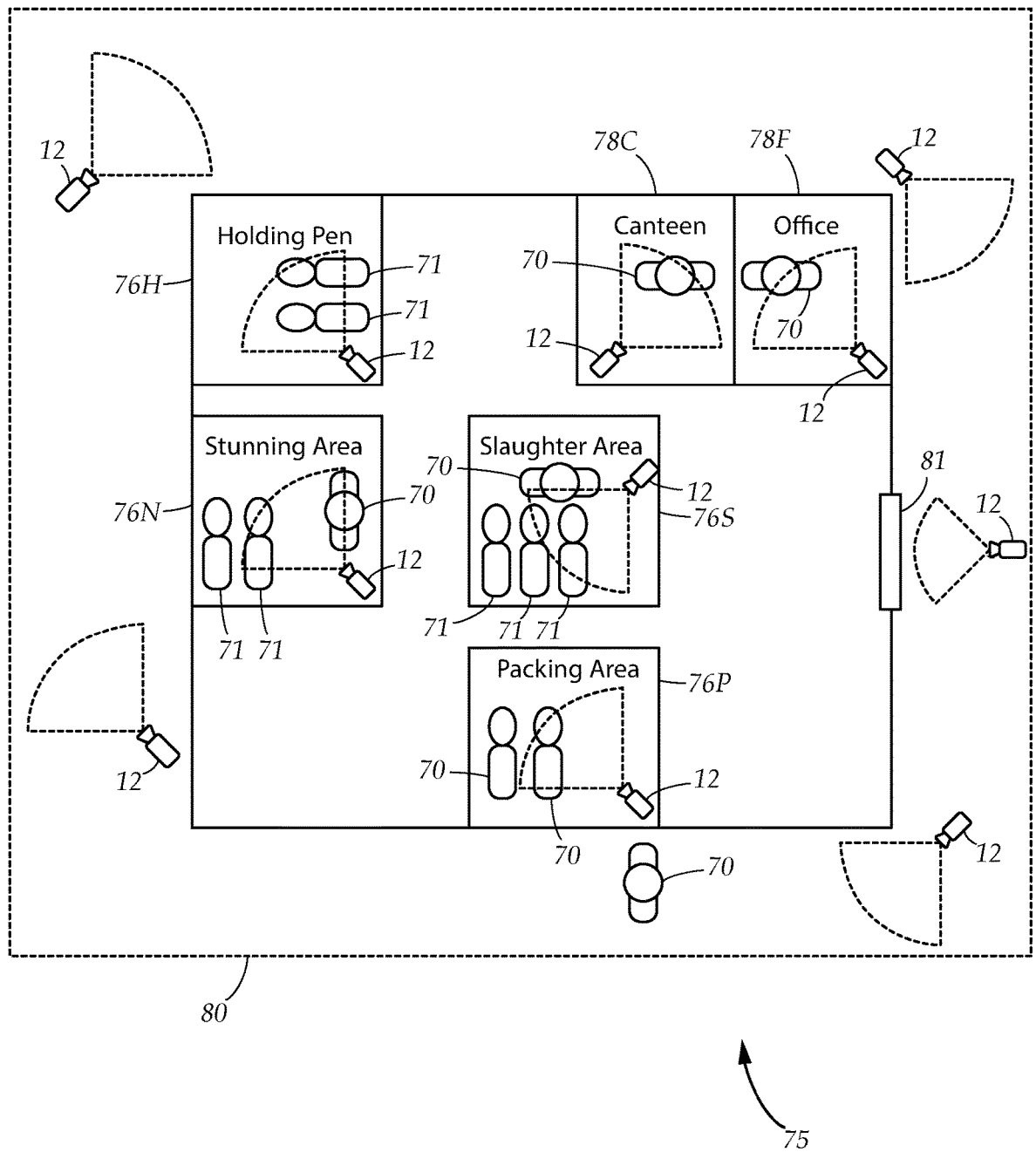
FIG. 5A is a diagrammatical plan view showing a meat packing facility with a plurality of zones and cameras, in accordance with an embodiment in the present disclosure.
Figure 5C:
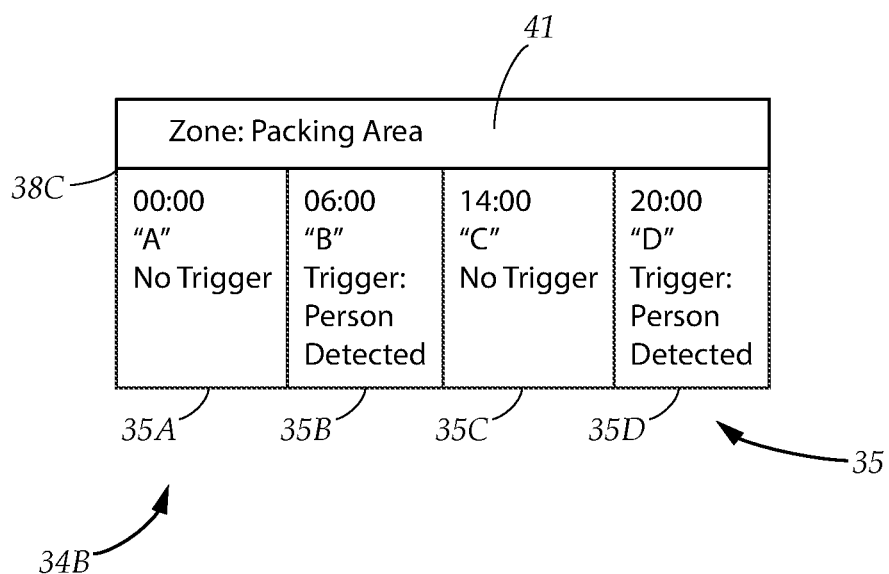
FIG. 5C is a block diagram showing a video file divided into segments based on the video retention requirements for each segment, in accordance with an embodiment in the present disclosure.

Turning to FIGS. 5A-C while also referring to FIG. 1A, an example meatpacking facility 75 is shown, representing another example recording entity which is subject to Federal regulatory requirements and industry-specific practices. An establishment which engages in the preparation, packing, or handling of meat or poultry products must retain records related to their operations. Such records are subject to inspection by government agencies, such as the Food Safety and Inspection Service (FSIS) of the US Department of Agriculture (USDA). Surveillance videos recorded by the recording entity are subject to a mix of voluntary Federal guidelines and mandatory requirements. For example, video recordings may be kept to voluntarily document humane handling of livestock and observance of proper sanitation procedures by workers at the meatpacking facility 75, in accordance with federal guidelines. The voluntary guidelines also encourage the use of exterior cameras to enhance perimeter security around the exterior of buildings. Although compliance with these guidelines is voluntary, relevant video recordings must be made available for FSIS access and inspection during an investigation of food safety, food security, or unlawful actions.

The meatpacking facility 75 has a plurality of interior zones which are directly related to meat processing functions—such as a holding pen 76H, a stunning area 76N, a slaughter area 76S, and a packing area 76P. The facility 75 has a canteen 78C and an office 78F which are not directly related to meat processing functions. The facility 75 is surrounded by multiple exterior zones 80, and has at least one door zone 81 which permits access to the interior of the facility 75. Each interior and exterior zone is observed by at least one camera 12.

In one embodiment, the video retention requirements 23 which are applicable to the recording entity may be referenced in the rules repository 21 by entering the industry 50, the location 52, and the retention objective 54. Any recording entity located in the United States will be subject to Federal jurisdiction. With regards to industry 50, establishments classified under NAICS codes 31161, 31162, among others, may be subject to these record retention policies. In the present example, the user selects three retention objectives: legal compliance 54R, industry standards 54P, and general safety 54S. The voluntary guidelines established by the USDA may be referenced under the industry standard 54P retention objective 54, while the mandatory requirements to provide all relevant records during governmental investigations may be referenced under the legal compliance 54R retention objective 54.

The present example focuses on three video retention requirements 23, embodied as rules 29 within the retention rules profile 28 of the recording entity. Rule "Handling" 29H is tailored for retention of video files 34 which show the handling of animals 71 by the workers, in accordance with industry standards 54P. The zone condition 58 refers to the holding pen 76H, the stunning area 76N, and the slaughter area 76S. The trigger 59 corresponds to a person detection, while the duration 60 is six months. This rule 29H thus causes the video retention server 20 to retain video files 34 in which persons are shown within the zones in which animals are handled.

Rule "Security" 29P is tailored for retention of video files 34 which show potential intrusions into the facility 75 and the tampering of meat products, which would be required to be provided to the regulatory authorities during a food tampering investigation, thus constituting legal compliance 54R. The zone conditions 58 may include the exterior zones 80 and the door zone 81, and the packing area 76P where the meat products are prepared and packaged. The trigger 59 may correspond to a person detection, while the duration 60 is for a period of two years. Rule "General Safety" 29S is tailored for retention of video files for general safety 54S, which causes all video files 34 to be retained for a duration 60 of one week. This rule 29S has applies to all zones, and the trigger 59 may be defined as continuous.

FIG. 5C shows video metadata 38C associated with an example video file 34B containing timing data which identifies times at which person detections occurred, and times at which no persons were detected within the content of the video file 34B. Referring to FIG. 5C while also referring to FIG. 1A, and FIG. 5A-B, the zone identifier 41 shows the video file 34B was recorded within the packing area 76P. Under rule 29S, the video file 34B will be retained for a period of one week. After one week has passed, the video retention requirement 23 imposed by rule 29S no longer applies. However, under rule 29P, the video must be retained for six years if a person is shown. In certain embodiments, the storage management module 26 may further be adapted to divide video files 34 into segments 35. When the storage management module 26 analyzes the video metadata 38C, the video file 34B may be divided into multiple segments 35A-D, allowing the individual segments 35 to be deleted or retained in order to conserve computer storage resources. Segments "A" and "C" 35A, 35C are not associated with any person detections and are no longer subject to any video retention requirements 23 and may be deleted. Segments "B" and "D" 35B, 35D, which do depict persons within their video content, will continue to be retained for the remainder of the duration of two years.

Figure 6A:
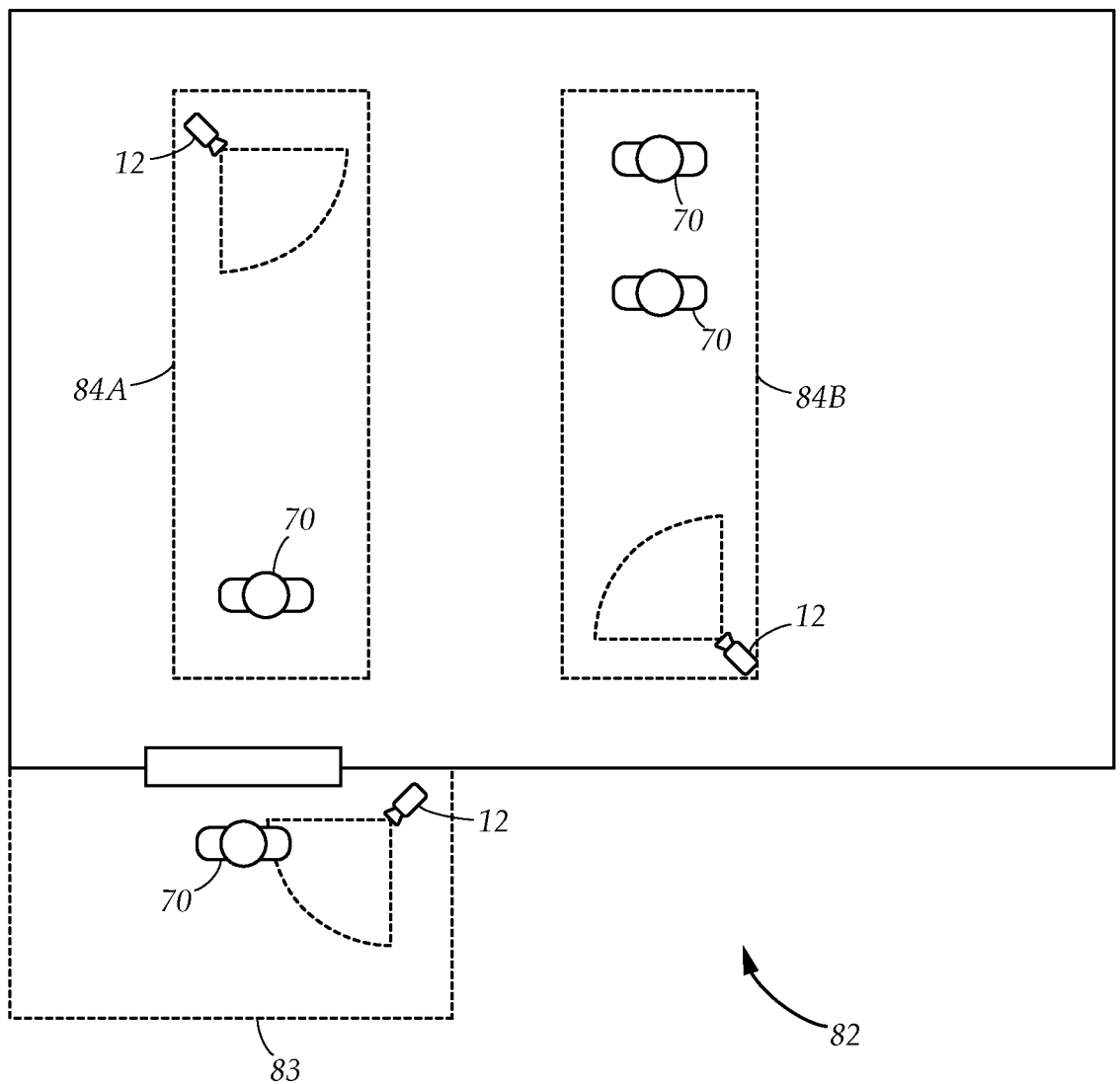
FIG. 6A is a diagrammatical plan view showing a retail store with a plurality of zones and cameras, in accordance with an embodiment in the present disclosure.

Turning now to FIG. 6A-B while also referring to FIGS. 1A-B and FIG. 3A, an example is shown where the recording entity operates a retail establishment 82. In the present example, the retail establishment 82 has several zones, including two aisle zones 84A, 84B where products are located, and an entrance zone 83 surrounding a door, through which persons 70 will enter and exit the retail establishment 82. Each zone is covered by a camera 12. For a retail establishment, two common concerns are protecting against theft, and recording accidents in which shoppers sustain injuries. States impose time limits in the form of a statute of limitations that prevent personal injury lawsuits from being initiated after a certain amount of time has elapsed. In order to prevent a recording of an accident from being deleted prematurely, it is necessary to retain any such video for a period of time which is at least as long as the statute of limitations. The user may choose to determine the video retention requirements 23 by location 52, industry 50, and the industry standard 54P and litigation defense 54L retention objectives 54.

In the present example, the rules module 22 generates one rule 29T with a zone condition 58 corresponding to the aisle zones 84A, 84B, a trigger 59 corresponding to a person detection, and a duration 60 of six months. This rule 29T is intended to cause retention of all video footage in which a person appears, in order to capture potential theft or shoplifting. Video footage which does not include any persons, would therefore not be subject to retention under this rule 29T.

Another example rule 29L is intended to protect the recording entity from slip and fall litigation, and has the retention objective of litigation defense 54L. The example recording entity is located in the state of South Carolina, which has a statute of limitations of three years. The rule 29L applies to all zones within the retail establishment 82, and a duration 60 of three years, which is equal to the statute of limitations. The trigger condition 59 reflects two event types. A person must be detected, and the person must be linked to a falling event. In a preferred embodiment, the video analysis module 24 is capable of recognizing whether a person appearing within the video has fallen, and thus records the occurrence of the falling event within the video metadata 38 associated with the video file 34. Rule 29L therefore causes the video retention server 20 to retain the video file 34 if a person appears within the video and falls.

The video retention system 10 may also be used to generate rules 29 which facilitate public safety by retaining video files 34 which may be related to crimes such as kidnapping of children. For example, a rule 29 may be generated which causes the video retention server 20 to retain video files 34 in which children are depicted, for any time duration 60 in order to comply with application laws and regulations, or for an unlimited time duration. The trigger condition 59 may specify a trigger attribute corresponding to an age category such as "child". In another example, the rule 29 may specify a trigger condition 59 in which the video is retained if a child appears in a group with an adult. This rule may specify a further trigger condition 59 which is met upon the detection of distress exhibited by the child or physical violence enacted by the adult. An example of a rule 29 designed to retain video footage of encounters which possibly precede kidnapping or assault by a perpetrator against a victim of a different gender, may specify a trigger condition 59 which combines detection of a group comprising a man and a woman, as well as a further trigger condition 59 which indicates physical violence or distress.

In certain embodiments, the video retention server 20 is further adapted to catalog the retained video files 34 through the use of the video metadata 38 associated with each file. For example, the video metadata 38 of retained video files 34 may be updated to associate the video file 34 with the rules 29 which embody the video retention requirements 23 which caused the retention of said video file 34. The management application 17 may also allow the user to locate video files which contain specific surveillance related content. For example, the video retention server 20 may be instructed to retrieve all video files 34 which contain falling incidents.

Referring to FIG. 1A along with FIG. 3A, in some embodiments, the video retention server 20 is adapted to perform a retention compliance audit by monitoring the operation of the video retention system 10 to ensure that video files 34 are captured and retained in accordance with the appropriate rules 29. For example, the video retention 20 server may monitor the output video received from the cameras 12 and/or the retained video files 34 to determine whether the video attributes meet the minimum video quality requirements 62 set forth in the appropriate rule 29. The retention compliance audit may be performed in real-time on video files 34 as they are created, or on extent video files 34 already retained within the video storage 32. For example, the retention compliance audit can be performed on extant video files 34 already retained prior to the deployment of the video retention system 10. The retention compliance audit can also be performed periodically if one or more of the rules 29 are updated to comply with changing retention requirements prompted by new laws, regulations, best practices or other factors.

The video retention server 20 may notify the user of any noncompliance with the rules 29 by displaying an alert or notification via the user device 18. In certain embodiments where the cameras 12 utilize with the video retention system 10 are remotely configurable, the video retention server 20 may automatically adjust the camera configuration 15 to ensure that the recorded video meets the minimum video quality requirements 62, by transmitting configuration data to the cameras 12 and/or the video recording unit 14 as appropriate, as will be appreciated by a person of ordinary skill in the art in the field of the invention.

Note that the rule examples provided herein are not intended to be limiting, and a person of ordinary skill in the art will appreciate that other rules may be created in accordance with the principles of the present disclosure, to retain video footage related to other scenarios and events not described herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a rules-based surveillance video retention system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A video retention system for use by a recording entity, comprising:
    one or more cameras for generating output video, the output video comprising image content;
    a video retention server having a video storage, the video retention server is adapted to retain the output video of each camera as a video file using the video storage;
    a rules module controlled by the retention server, the rules module having a rules repository having a plurality of retention parameters and a plurality of retention requirements, each retention requirement is linked to a combination of at least two of the retention parameters, allowing the rules module to identify the retention requirements applicable to the recording entity by referencing the retention parameters, the retention parameters comprising a plurality of location parameters and a plurality of industry parameters, and the retention requirements comprising a plurality of time durations;
    a user device connected to the video retention server via a digital communication network, the user device accepts input from a user which defines a geographic location corresponding to one of the location parameters and a selected industry which corresponds to one of the industry parameters, and transmits the geographic location and the selected industry to the video retention server, whereby the rules module identifies the retention requirements applicable to the recording entity by matching the geographic location and the selected industry to the retention requirement linked to said location parameter and the corresponding industry parameter, and generates a retention rules profile containing the time duration of the retention requirement applicable to the recording entity; and
    a storage management module controlled by the video retention server, the storage management module reviews each video file within the video storage, and deletes each video file which has been retained within the video storage for a length of time greater than the time duration specified by the retention rules profile.

2. The video retention system as described in claim 1, wherein:
    each video file has video attributes comprising a video resolution and a video framerate;
    the video retention server further has a video encoding module adapted to alter the video attributes of the video files;

each retention requirement within the rules repository further includes a video quality requirement which defines a required resolution or a required framerate; and the storage management module reviews each retained video file and alters the video attributes of the video file to match the required resolution or required framerate specified by the retention rules profile.

3. The video retention system as described in claim 2, wherein:

the retention parameters further include a plurality of retention objectives including a first retention objective and a second retention objective, each retention requirement is linked to a combination of one of the location parameters, one of the industry parameters, and one of the retention objectives; and the input from the user which is transmitted to the video retention server further includes a selected retention objective corresponding to the first or second retention objectives, and the retention rules profile is generated by matching the defined geographic location, the selected industry, and the selected retention objective to the retention requirement linked to the corresponding location parameter, industry parameter, and the retention objective.

4. The video retention system as described in claim 3, wherein:

at least one of the retention requirements is further linked to an event trigger and an event-related time duration;

the video retention server has a video analysis module adapted to analyze the video files and generate video metadata for each video file, the video analysis module is further adapted to detect an event occurrence matching the event trigger which is depicted within the image content of one of the video files and log the event occurrence within the video metadata;

the retention rules profile is generated to further include the event trigger and the event-related time duration; and the storage management module reviews the video metadata of each video file within the video storage, and overrides the time duration of the retention rules profile for each video file which contains the event occurrence, such that said video files are only deleted upon expiration of the event-related time duration.

5. The video retention system as described in claim 4, wherein:

each camera is associated with a zone;

at least one of the retention requirements reflected within the retention rules profile is linked to a zone condition corresponding to one of the zones; and the storage management module applies said retention requirement only to the video files produced by the camera associated with the zone to which the zone condition corresponds.

6. The video retention system as described in claim 4, wherein:

the industry parameters are each associated with an industry code, and the user device allows the user to define the selected industry by inputting or selecting one of the industry codes using a management interface.

7. The video retention system as described in claim 6, wherein:

each location parameter is linked to one of a plurality of jurisdictions, and each retention requirement within the rules repository embodies a legal or regulatory requirement linked to one of the industry codes and one of the jurisdictions, whereby said legal or regulatory requirement is referenced by the rules module using the geographic location and the industry code defined by the user.

8. The video retention system as described in claim 7, wherein:

the video analysis module is adapted to detect persons appearing within the image content of the video files, and is further adapted to detect a falling incident whereby one of the persons falls; and the event trigger corresponds to the falling incident, and the event-related time duration corresponds to a statute of limitations length associated with the jurisdiction with which the geographic location is linked.

9. The video retention system as described in claim 7, wherein:

the video analysis module is adapted to detect persons appearing within the image content of the video files, and is further adapted to detect personal attributes for each of the detected persons, comprising age category and gender; and the event trigger specifies one of the personal attributes as a trigger attribute, and the event occurrence corresponds to video analysis module detecting one of the persons having the trigger attribute.

10. The video retention system as described in claim 4, wherein:

the storage management module is further adapted to divide each retained video file within the video storage into a plurality of time sequenced video segments, and delete the video segments which do not contain the event occurrence.

11. A method for retaining video associated with a recording entity, comprising the steps of:

providing a video retention server, the video retention server having a video storage, a rules module, and a storage management module, the rules module having a rules repository having a plurality of retention parameters and a plurality of retention requirements, each retention requirement is linked to a combination of at least two of the retention parameters, the retention parameters comprising a plurality of location parameters and a plurality of industry parameters, and the retention requirements comprising a plurality of time durations;

entering an input to a user device by a user and transmitting the input to the video retention server from a user device, the input defining a geographic location corresponding to one of the location parameters and a selected industry which corresponds to one of the industry parameters;

identifying the retention requirement within the rules repository applicable to the recording entity using the rules module, by matching the defined geographic location and the selected industry to the retention requirement which is linked to the corresponding location parameter and the corresponding industry parameter;

generating a retention rules profile using the rules module containing the time duration of the retention requirement applicable to the recording entity;

receiving output video from one or more cameras by the video retention server, and retaining the output video from each camera as a video file using the video storage; and deleting each video file which has been retained within the video storage for a length of time greater than the time duration specified by the retention rules profile, using the storage management module.

12. The method for retaining video as recited in claim 11, wherein:
    each video file has video attributes comprising a video resolution and a video framerate;
    the video retention server further has a video encoding module;
    each retention requirement within the rules repository further includes a video quality requirement which defines a required resolution or a required framerate;
    the step of generating a retention rules profile further comprises embodying the video quality requirement of the retention requirement applicable to the recording entity within the rules retention profile; and
    the step of deleting each video file is preceded by the step of reviewing each retained video file by the storage management module and altering the video attributes of the video file to match the video quality requirement specified by the retention rules profile.

13. The method for retaining video as recited in claim 12, wherein:
    each video file has video image content;
    at least one of the retention requirements within the rules repository is further linked to an event trigger and an event-related time duration;
    the video retention server further has a video analysis module;
    the step of generating a retention rules profile further comprises embodying the event trigger and the event-related time duration within the retention rules profile;
    the step of receiving output video is followed by the step of analyzing each video file by the video analysis module and generating video metadata for each video file, detecting an event occurrence matching the event trigger which is depicted within the image content of one of the video files, and logging the event occurrence within the video metadata; and
    the step of deleting each video file is followed by the step of reviewing the metadata of each video file by the storage management module, overriding the time duration of the retention rules profile for each video file which contains the event occurrence, and deleting said video files only upon expiration of the event-related time duration.

14. The method for retaining video as recited in claim 13, wherein:
    the industry parameters are each associated with an industry code;
    the step of entering an input further comprises defining the selected industry by the user entering or selecting one of the industry codes via the user device; and
    the step of identifying the retention requirement further comprises matching the selected industry to the industry parameter using the industry code inputted by the user.

15. The method for retaining video as recited in claim 14, wherein:
    each location parameter is linked to one of a plurality of jurisdictions, and each retention requirement within the rules repository embodies a legal or regulatory requirement linked to a combination of one of the industry codes and one of the jurisdictions; and
    the step of identifying the retention requirement further comprises matching the defined geographic location and the selected industry to the retention requirement which embodies the legal or regulatory requirements applicable to the recording entity and which is linked to the corresponding location parameter and industry parameter.

16. The method for retaining video as recited in claim 15, wherein:
    the step of analyzing each video file further comprises dividing each video file containing the event occurrence into a plurality of time sequenced video segments, deleting the video segments which do not contain the event occurrence, and saving within said video file only the video segments which contain the event occurrence.

17. The method for retaining video as recited in claim 15, wherein:
    the event trigger corresponds to a falling event, and the event-related time duration corresponds to a statute of limitations length;
    the step of identifying the retention requirements further comprises identifying the statute of limitations length of the jurisdiction associated with the geographic location; and
    the step of analyzing each video file further comprises detecting persons appearing within the image content of the video files, detecting an event occurrence matching the event trigger which is depicted within the image content of one of the video files, the event occurrence corresponding to the video analysis module detecting one of the persons falling, and logging the event occurrence within the video metadata.

18. The method for retaining video as recited in claim 15, wherein:
    the video analysis module is adapted to detect persons appearing within the image content of the video files, and detect personal attributes for each of the detected persons comprising age category or gender;
    the event trigger is a trigger attribute corresponding to one of the personal attributes; and
    the step of analyzing each video further comprises detecting an event occurrence matching the event trigger which is depicted within the image content of one of the video files, the event occurrence corresponding to the video analysis module detecting the trigger attribute associated with one of the detected persons, and logging the event occurrence within the video metadata.

* * * * *